United States Patent [19]

Makar

[11] 4,061,598

[45] Dec. 6, 1977

[54] CATALYST FOR HYDROGENATING ANTHRAQUINONES

[75] Inventor: Kamel Michel Makar, Memphis, Tenn.

[73] Assignee: E. I. Du Pont de Nemours and Company, Wilmington, Del.

[21] Appl. No.: 699,933

[22] Filed: June 25, 1976

[51] Int. Cl.$^2$ .................. B01J 21/04; B01J 23/44; B01J 23/58
[52] U.S. Cl. ............................. 252/466 PT; 423/588
[58] Field of Search .................. 252/466 PT; 423/588

[56] References Cited

U.S. PATENT DOCUMENTS

| | | | |
|---|---|---|---|
| 2,657,980 | 11/1953 | Sprauer | 423/588 |
| 3,615,207 | 10/1971 | Lee | 252/466 PT |

*Primary Examiner*—W. J. Shine

[57] ABSTRACT

A palladium-on-alumina catalyst having high activity and long life and which gives low anthraquinone usage in the cyclic anthraquinone process for making $H_2O_2$ is produced by impregnating the alumina under conditions such that the pore surfaces are rendered alkaline and the rate of diffusion of catalytic metal into the pores is controlled.

13 Claims, No Drawings

CATALYST FOR HYDROGENATING ANTHRAQUINONES

FIELD OF THE INVENTION

The invention is directed to a novel catalyst for the hydrogenation of anthraquinones and to the method of making it. In particular, it is directed to a palladium-on-alumina catalyst for use in the hydrogenation step of a cyclic anthraquinone process for making $H_2O_2$.

BACKGROUND OF THE INVENTION

In the cyclic process for making hydrogen peroxide, alkyl anthraquinones are catalytically hydrogenated in solution to yield the corresponding anthrahydroquinones. Upon oxidizing the anthrahydroquinone, hydrogen peroxide is produced and the alkyl anthraquinone is regenerated. The hydrogen peroxide is then removed from the solution, usually by extraction with water, and the solution containing regenerated alkyl anthraquinone is recycled to the hydrogenation step.

In this process, the conventional catalytic metals have been Raney nickel and the noble metals, platinum, rhodium and palladium, of which the last has been preferred because of its resistance to poisoning and its ease of regeneration. In this regard, it was disclosed by Sprauer in U.S. Pat. No. 2,657,980 that life and activity of palladium catalysts are extended by supporting them on activated alumina, particularly, alpha- or gamma-alumina. In addition, Keith et al disclose in U.S. Pat. No. 3,635,841 that palladium catalysts supported on delta-alumina, theta-alumina or mixtures thereof free of alpha- or gamma-alumina are effective. Both fixed bed and fluid bed (slurry) operations have been used for these catalysts.

BRIEF DESCRIPTION OF THE INVENTION

The invention is directed to a still further improvement of the life and activity of palladium-on-alumina catalyst which is obtained by impregnating the alumina under conditions such that the pore surfaces are rendered alkaline and the rate of diffusion of the palladium into the pores is controlled.

More particularly, the invention is directed to a method for making catalysts which are useful for the hydrogenation of anthraquinones and which give low anthraquinone consumption in a cyclic anthraquinone process for making $H_2O_2$ comprising the sequential steps of a. impregnating dry activated alumina particles with 2-20 phr (basis dry activated alumina) of alkaline carbonate and 0.1-10 phr of a basic palladium salt preferably 0.3-5 phr of a basic palladium salt by admixing the alumina with finely divided particles of the palladium salt and an aqueous solution of the carbonate in which the amount of water is sufficient to wet the pores, but not the outer surface of the alumina, and allowing the impregnated alumina to stand for a time sufficient to complete diffusion of the palladium within the wetted pores of the catalyst;

b. reducing the palladium by dispersing the impregnated alumina in a dilute aqueous solution of reducing agent, the amount of reducing agent being sufficient to reduce substantially all the palladium to a zero valence state;

c. separating the reduced catalyst from the solution of reducing agent, washing it with water and then removing substantially all the water therefrom while maintaining the catalyst at a temperature below about 100° C; and d. heating the dewatered catalyst in an oxidizing atmosphere for a period of at least about 1 hour at a temperature of 400°-650° C.

DEFINITIONS

As used herein, the term "activated alumina" refers to a natural or synthetic hydrated alumina which has been dehydrated or partially dehydrated by heating in a known manner, e.g., at 300°-1200° C, whereby a microporous alumina is obtained.

The term "dry activated alumina" refers to activated alumina which has been heated at an elevated temperature until no further loss in weight is incurred. A temperature of 100°-200° C is suitable for this purpose, about 160° C being preferred.

Unless expressly indicated otherwise, all surface area measurements are referred to herein by the so-called "BET method" described by Brunauer, Emmett and Teller in their article "Adsorption of Gases in Multimolecular Layers", JACS, Vol. 60, p 309, Feb. 1938.

As used herein, the term "phr" means parts by weight per 100 parts by weight of dry activated alumina prior to impregnation.

The term "carbonate" includes bicarbonate ($—HCO_3$) as well as carbonate ($=CO_3$).

Mesh sizes referred to herein are U.S. Standard. When a range of mesh sizes is given, e.g., 50–200, it is meant that all of the material in question will pass through the coarser mesh and be retained on the finer mesh.

DESCRIPTION OF THE PRIOR ART

It is, of course, well known to prepare alumina-supported palladium catalysts by impregnating the alumina with a solution of water-soluble inorganic salt of the palladium metal such as sodium palladium chloride, palladous chloride, chloropalladous chloride, etc. In U.S. Pat. Nos. 2,657,980 and 2,802,794, Sprauer discloses the impregnation of activated alumina with palladium by the addition of an aqueous solution of palladous chloride to an aqueous slurry of the alumina.

Thus, the prior art teaches that palladium impregnation is carried out principally by adding the metal, usually in solution, to the alumina while it is immersed in water.

Following impregnation, the catalyst is reduced, either with or without prior chemical treatment to precipitate the metal, with a reducing agent such as formaldehyde or hydrazine. Following reduction, the catalyst is then washed and dried to complete preparation of the catalyst for use.

DETAILED DESCRIPTION OF THE INVENTION

Though activated aluminas in general are suitable as supports for palladium catalysts intended for use in hydrogenating anthraquinones, nevertheless certain ones having a particular major crystalline structure are preferred and others are less desirable because they give catalysts of lower efficacy. In particular, it has been found that palladium catalysts prepared on gamma-alumina substantially free of alpha-alumina are very good. In addition, delta- and/or theta-alumina substantially free of both alpha- and gamma-alumina have been advocated. The particular type of activated alumina is not, therefore, by itself critical in obtaining the advantages of the invention.

It is, however, preferred that the surface area of the alumina be from about 25 to about 400 m²/gm, from about 50 to about 200 m²/gm being preferred since it appears to give the catalyst better selectivity and thus yields fewer degradation products.

So long as the above surface area requirements are met, the particle size of the activated alumina is not at all critical and depends upon the type of operation. For fixed bed operation, the alumina will usually be in the form of spheres or cylinders of 3 to 65 mesh (6 to 0.2 mm) size. On the other hand, for fluid bed (slurry) operation in which the catalyst is suspended in the working solution, the catalyst is usually from about 20 to about 200 mesh in order to minimize the amount of energy which must be expended to keep the catalyst in suspension.

The amount of water to wet the pores without wetting the outer surface of the alumina depends, of course, on the volume of the available pores. For example, it was found that 19 gms of water was sufficient to fill the pores of 50 gms of a commericially available activated alumina having a surface area of 200-300 m²/g. The precise amount of water needed is most readily determined by adding enough water to the alumina so that it no longer flows freely and then adding back and mixing additional alumina until the mixture becomes free flowing.

The precise role of the alkaline carbonate is not known. However, it has been noted that, by rendering the pH of the pore surfaces alkaline before the catalytic metal is reduced, the activity of the catalyst is higher. The amount of alkaline carbonate should be from about 2 to about 20 phr and it is preferred that higher amounts within this range be used when more basic palladium salts are used for impregnation and that lower amounts be used when less basic palladium salts are employed. From about 4 to 10 phr potassium bicarbonate has been found to be optimum for impregnation with sodium palladium chloride ($Na_2PdCl_4$).

Suitable alkaline carbonates are alkali metal and alklaine earth metal carbonates, which are soluble in water at room temperature. Because of their generally greater water solubility, bicarbonates are preferred, particularly alkali metal bicarbonates.

The sequence of adding the carbonate to the pores of the catalyst vis-a-vis the palladium salt is not critical in the strict sense of operability. That is, the carbonate can be added before, after or simultaneously with the palladium salt. However, it is preferred to impregnate the alumina support with alkaline carbonate before adding the palladium since somewhat higher activities are observed for some aluminas.

Any basic palladium salt which is soluble in water at room temperature is suitable for the catalysts of the invention. The salt should, however, be in finely divided solid form which will facilitate uniform dry blending with the alumina as well as rapid hydrolysis within the pores. To facilitate uniform blending, it is preferred that the palladium salt particles be smaller than the alumina particles. However, to avoid too rapid dissolving action in the case of very highly soluble salts, it is preferred that the palladium salt not be smaller than about 300 mesh. On the other hand, a particle size larger than about 20 mesh may dissolve too slowly. A particle size of 50-300 mesh is therefore preferred.

The palladium salt is blended with the alumina in dry form in order to obtain higher activity and life. Though the reason for this unexpected benefit is not fully understood, it is believed to be related to the diffusion rate of the palladium into the pores. Whereas, in conventional impregnation systems, the palladium is uniformly dissolved in the water when it diffuses into the pores, in the method of the invention, a concentration gradient of palladium exists between the surface and pores of the alumina even when diffusion of the palladium is completed. Virtually all of the palladium is deposited within the pores of the alumina, the greater amount being near the surface of the pores where it can be most effective.

The precise manner of blending the alumina with the water containing the alkaline carbonate and the palladium salt is not critical and conventional dry blending procedures can be used such as a ribbon mixer, tumbling barrels or double cone mixer.

In order to complete diffusion of the palladium into the alumina pores, it is necessary to maintain the alumina in the dry blended form for an extended time because of the slow diffusion rate of the dry blended palladium salt. For this reason, the dry blend should be allowed to stand, either with or without further mixing, for at least 0.5 hour, preferably at least 5 hours and still more preferably 30 hours or longer. For a catalyst batch of given size, the optimum time for this variable is primarily a function of the pore geometry of the alumina support. For example, smaller pore sizes will usually require longer diffusion times.

Furthermore, large batches of catalyst also seem to require longer diffusion times. Longer diffusion times do not, however, appear to be in any way disadvantageous.

When the desired time for diffusion of the palladium salt has elapsed, the impregnated catalyst is then reduced by contacting it with an aqueous solution of a reducing agent such as formaldehyde or hydrazine of which non-acid reducing agents such as hydrazine are preferred. The precise concentration of reducing agent is not critical. However, the amount of reducing agent should be sufficient to reduce all of the palladium in the catalyst to a zero valence state. It will be apparent to those skilled in the art that the precise amount of palladium which has been reduced is not itself critical. However, because of the very high cost of the catalyst, it would be highly uneconomical to reduce less than substantially all of the palladium. Thus, usually a stoichiometric excess will be used to insure that reduction is completed. However, larger concentrations are to be avoided in order to minimize the problem of removing the excess from the catalyst and to avoid wasteful consumption of reducing agent. For this reason, dilute aqueous solutions of the reducing agent are preferred. The time for reducing the palladium may be very short since the reduction reaction is very rapid. Therefore, so long as sufficient reducing agent is present, only enough time to assure contact of reducing agent with the palladium surface is needed. This will ordinarily be only a few seconds.

Following reduction of the palladium, the reducing solution is removed from the catalyst. This is most easily done by filtering the catalyst from the reducing agent and then slurrying the catalyst in water and dewatering the catalyst. The dewatering step must be conducted in such manner that the character of the palladium deposits is not changed. For this reason, the dewatering step must be carried out at temperatures below 100° C and preferably below about 80° C. However, within this limitation of upper temperature, the precise way in which the dewatering is carried out is not critical. Ordinarily, the catalyst is readily dewatered by either filtration or centrifugation. Even though absolutely complete dewatering is not necessary, it is nevertheless preferred to remove at least about 80% wt of the water to conserve energy in the subsequent heating step which is described below. It is preferred that the washing step be carried out as often or as long as is necessary to obtain a wash water having pH 7.0 ± 0.1.

The last step of the method of the invention is to heat the catalyst in an oxidizing atmosphere for an extended period at a temperature of 400° to 650° C and preferably 500° to 600° C. This "roasting" step constitutes a last rearrangement of the metal deposited within the pores of the alumina and thus places the catalyst fully in condition for use. In the laboratory, the oxidizing atmosphere was provided by leaving the door of a laboratory oven slightly open. In large scale production, this can be done by continuously passing a small stream of air over the catalyst during the roasting operation. This final redistribution of the palladium takes at least about one hour and preferably three hours or longer.

The invention will be understood more readily by reference to the following examples which illustrate the method of the invention as well as the use of catalysts prepared thereby.

EXAMPLE I

The example illustrates a preferred procedure for carrying out the method of the invention in the preparation of a palladium-on-alumina catalyst containing 0.7% wt Pd.

A quantity of activated alumina (Kaiser A-300) was first screened to remove particles passing through a 200 mesh screen, then dried. To fifty grams of the dried alumina was added 19 grams of deionized water in which had been dissolved 2 grams of potassium bicarbonate and the admixture was mixed and allowed to stand for 45 minutes at room temperature (~20° C). The resulting mixture was still granular and free-flowing, thus showing that the surface was not wetted and that the water had been adsorbed into the pores of the alumina.

Precisely 1.0 gram of powdered sodium palladium chloride was then added to the bicarbonate impregnated alumina and the admixture was blended in a small tumbling barrel mixer for 30 minutes. The blended catalyst was then allowed to sit for 48 hours at room temperature during which time the diffusion of palladium salt into the pores was completed.

To the palladium-impregnated catalyst was added 250 ml of an aqueous solution of hydrazine prepared by diluting 5 ml of 64% wt aqueous hydrazine with 245 ml deionized water. The admixture of catalyst and reducing solution was stirred for 30 minutes using a magnetic stirrer and allowed to stand for an additional four hours at room temperature. The reducing step of the process was carried out under a ventilating hood.

Upon removing the stirrer, the catalyst was then filtered out of the hydrazine solution and washed with deionized water until the wash water had a pH of 7.0. The still moist catalyst was then dried by heating it overnight in an air-circulation oven at 30° C. The next day, the catalyst was placed in an oven preheated to 550° C and kept there for four hours after which it was removed and cooled to room temperature in a dessicator. An oxidizing atmosphere was provided in the oven by leaving the door ajar.

EXAMPLE II

The procedure of Example I was then used to prepare a catalyst containing about 1% wt palladium by changing the proportions of the reagents to the following:
Potassium bicarbonate: 5 g
Sodium palladium chloride: 1.4 g
64% Hydrazine solution: 110 ml

EXAMPLE III

The procedure of Example II was used to prepare a catalyst from 5 gms of dry alumina containing 0.9% wt palladium except that the amount of water used in the impregnation step was sufficient to wet the outer surface of the catalyst, approximately 30 ml.

EXAMPLE IV

Using palladium-on-alumina catalysts prepared in accordance with the preceeding Examples, each was tested for both life and activity in a continuous pilot-scale cyclic hydrogen peroxide process. The working solution was taken from a commercial-scale process and consisted essentially of a mixture of alkyl-substituted anthraquinones dissolved in a mixed organic solvent. As would be expected the working solution also contained small amounts of inerts and other degradation products.

The pilot-scale cyclic process unit is comprised of (1) an hydrogenation step in which the regenerated anthraquinone is reduced to the anthrahydroquinone form, (2) an oxidation step in which the anthrahydroquinone is oxidized with air to release $H_2O_2$ and regenerated to the anthraquinone form; (3) an extraction step in which $H_2O_2$ is extracted with water; and (4) a working solution regeneration step in which a splitstream of working solution is treated with an adsorbent to regenerate some degradation products and to remove some inerts by adsorption. The pertinent operating conditions of the pilot-scale process unit were as follows:

HYDROGENATION STEP

Hydroquinone titer[1]: 36 lb mole/$10^4$ gal
Residence time: 31.5-39 min
Temperature: 50° C
% Wt $H_2O_2$ in feed: 0.25 - 0.30
Top pressure: 14.5 psig
% Vol $H_2$ in vent gas: 70

[1]As used herein, the term "titer" is a measure of the concentration of hydroquinone, as specified, in the working solution. Units are pound-moles per 10,000 gallons of working solution.

OXIDIZER

Average temperature: 53° C

REGENERATOR

Basic: 10% of working solution ex extractor
Average Temperature: 85° C
Adsorbent: Activated $Al_2O_3$ Under the above operating conditions, each of the above-described catalyst was tested in the pilot-scale unit by adding it to working solution in an amount sufficient to maintain a hydroquinone titer of about 36 in the hydrogenator over the time of the test (5-21 days). The following data were obtained.

TABLE I

PILOT-SCALE ACTIVITY AND LIFE TESTS

| | Catalyst Variables | | % Catalyst Loading equiv. per gm of total slurry × 100 | Process Variables | | | Hydrogenator Residence Time minutes |
|---|---|---|---|---|---|---|---|
| Reference | Preparation Procedure | % wt Pd | | Hydroquinone Titer | % Catalyst Turnover gm catalyst turned over per 100 gm $H_2O_2$ produced | Time (hrs) | |
| 1 | Example II | 0.96 | 5.6 | 36 – 38 | None | 140 | 39 |
| 2 | Example I | 0.7 | 6.3 | 36 | None | 120 | 39 |
| 3 | Example I | 0.7 | 8.6 | 36 | None<br>0.4 | 192<br>504 | 31.5 |
| 4 | Example III | 0.9 | 11.2 | 29 | — | ca. 72 | 39 |

The above data show that the catalyst prepared by the "dry" procedure of the invention required considerably lower loading to attain an hydroquinone titer of 36 than was required to reach an hydroquinone titer of only 29 with the catalyst prepared by the "wet" procedure. Thus, the catalysts made by the method of the invention were considerably more active than those made by the procedure in which large amounts of water were used. Furthermore, the fact that the Reference 3 catalyst of the invention was able to sustain a high hydroquinone titer for as long as three weeks with little or no catalyst turnover, indicates that the catalyst of the invention has excellent operating life as well as higher activity level.

It was noteworthy, too, that in the three-week test of the Reference 3 catalyst, anthraquinone use was only 0.09 gm per 100 gm of 100% $H_2O_2$ produced, which is quite low.

I claim:

1. A method for making catalysts which are useful for the hydrogenation of anthraquinones comprising the sequential steps of
    a. impregnating dry activated alumina particles with 2-20 parts by weight of alkali metal carbonate or alkaline earth metal carbonate and 0.1-10 parts by weight of a basic palladium salt, said parts by weight being based on 100 parts by weight of dry activated alumina prior to impregnation, by admixing the alumina with finely divided particles of the palladium salt and an aqueous solution of the carbonate in which the amount of water is sufficient to wet the pores, but not the outer surface of the alumina, and allowing the impregnated alumina to stand for a time sufficient to complete diffusion of the palladium within the wetted pores of the catalyst;
    b. reducing the palladium by dispersing the impregnated alumina in a dilute aqueous solution of reducing agent, the amount of reducing agent being sufficient to reduce substantially all the palladium to a zero valence state;
    c. separating the reduced catalyst from the solution of reducing agent, washing it with water and then removing substantially all the water therefrom while maintaining the catalyst at a temperature below about 100° C; and
    d. heating the dewatered catalyst in an oxidizing atmosphere for a period of at least about 1 hour at a temperature of 400°-650° C.

2. The method of claim 1 in which the basic palladium salt is sodium palladium chloride.

3. The method of claim 1 in which the alumina is impregnated with potassium bicarbonate.

4. The method of claim 1 in which the alumina is substantially free of alpha alumina.

5. The method of claim 4 in which the major crystalline structure of the alumina is gamma-alumina.

6. The method of claim 4 in which the major crystalline structure of the alumina is delta-alumina, theta-alumina or mixtures thereof substantially free of alpha-alumina and gamma-alumina.

7. The method of claim 1 in which the surface area of the alumina is 25-400 m²/gm.

8. The method of claim 1 in which the alumina is impregnated with 0.3-5 parts by weight basic palladium salt.

9. The method of claim 1 in which the temperature of the catalyst during the dewatering step is maintained below about 80° C.

10. The method of claim 1 in which the reducing agent is non-acidic.

11. The method of claim 10 in which the reducing agent is hydrazine.

12. The method of claim 1 in which the alumina is first impregnated with an aqueous solution of the carbonate and then admixed with the particles of palladium salt.

13. The method of claim 1 in which the alumina is first admixed with the particles of palladium salt and then inpregnated with the aqueous solution of the carbonate.

* * * * *